US011222527B2

(12) United States Patent
Young et al.

(10) Patent No.: US 11,222,527 B2
(45) Date of Patent: Jan. 11, 2022

(54) METHOD, APPARATUS, AND SYSTEM FOR VEHICLE MAP DATA UPDATE

(71) Applicant: HERE GLOBAL B.V., Eindhoven (NL)

(72) Inventors: Jeremy Michael Young, Chicago, IL (US); Leon Stenneth, Chicago, IL (US)

(73) Assignee: HERE Global B.V., Eindhoven (NL)

(*) Notice: Subject to any disclaimer, the term of this patent is extended or adjusted under 35 U.S.C. 154(b) by 228 days.

(21) Appl. No.: 16/543,162

(22) Filed: Aug. 16, 2019

(65) Prior Publication Data
US 2021/0049901 A1    Feb. 18, 2021

(51) Int. Cl.
| G08G 1/01 | (2006.01) |
| H04L 29/08 | (2006.01) |
| G01C 21/32 | (2006.01) |
| G06K 19/06 | (2006.01) |
| G05D 1/00 | (2006.01) |

(52) U.S. Cl.
CPC ........... *G08G 1/0116* (2013.01); *G01C 21/32* (2013.01); *G05D 1/0088* (2013.01); *G06K 19/06028* (2013.01); *G06K 19/06037* (2013.01); *H04L 67/12* (2013.01); *H04L 67/10* (2013.01)

(58) Field of Classification Search
CPC .. G08G 1/0116; G08G 1/09623; G01C 21/32; G01C 21/3881; G06K 19/06028; G05D 1/0088
See application file for complete search history.

(56) References Cited

U.S. PATENT DOCUMENTS

| 7,100,825 B2 | 9/2006 | Levine |
| 8,160,814 B2 | 4/2012 | Nakamura et al. |
| 8,521,424 B2* | 8/2013 | Schunder ........... G01C 21/3881 |
| | | 701/452 |
| 10,890,663 B2* | 1/2021 | Shroff ................... G01S 17/58 |
| 2009/0303036 A1* | 12/2009 | Sahuguet ............. G06F 16/444 |
| | | 340/539.13 |
| 2012/0202525 A1 | 8/2012 | Pettini |

(Continued)

FOREIGN PATENT DOCUMENTS

| WO | 1999060544 A1 | 11/1999 |
| WO | 2012154117 A1 | 11/2012 |
| WO | 2015172770 A1 | 11/2015 |

OTHER PUBLICATIONS

Ozan, abstract of "QR Code Based Signage to Support Automated Driving Systems on Rural Area Roads", Conference Paper, International Joint conference on Industrial Engineering and Operations Management, XXIVIJCIEOM 2018: Industrial Engineering and Operations Management II, Jul. 2018, 4 pages.

*Primary Examiner* — Michael J Zanelli
(74) *Attorney, Agent, or Firm* — Ditthavong, Steiner & Mlotkowski

(57) ABSTRACT

An approach is provided for vehicle map data update. The approach involves, for example, processing sensor data captured by a sensor of a vehicle to detect a machine-readable visual representation. The machine-readable visual representation encodes map data corresponding to a map tile of a geographic database. The approach also involves decoding the map data from the machine-readable visual representation. The approach further involves updating a local copy of the map tile stored in the vehicle based on the map data.

20 Claims, 14 Drawing Sheets

(56) References Cited

U.S. PATENT DOCUMENTS

| | | | |
|---|---|---|---|
| 2013/0222175 A1* | 8/2013 | Smith | B60K 31/0058 |
| | | | 342/70 |
| 2019/0294898 A1* | 9/2019 | Jin | B60W 40/02 |
| 2020/0249689 A1* | 8/2020 | Tatsubori | G05D 1/0234 |

* cited by examiner

METHOD, APPARATUS, AND SYSTEM FOR VEHICLE MAP DATA UPDATE

BACKGROUND

Autonomous driving and/or other applications that rely on having up-to-date digital map data are often very dependent on connected technologies (e.g., cellular data networks) to keep up with real-world changes in map data. However, when such connected technologies are unavailable (e.g., in areas with limited or no data network coverage), over-the-air (OTA) access to the latest map updates may also be limited or unavailable. This can make autonomous driving (or other map-dependent applications) less reliable or even potentially unsafe. Accordingly, map service providers face significant technical challenges to ensuring that vehicles (particularly autonomous vehicles) can access map updates when OTA map updates are unavailable or otherwise limited.

SOME EXAMPLE EMBODIMENTS

Therefore, there is a need for an approach for efficient and accurate vehicle map data update, e.g., when over-the-air (OTA) map data update is unstable, interrupted or unavailable.

According to one embodiment, a computer-implemented method for vehicle map data update comprises processing sensor data captured by a sensor of a vehicle to detect a machine-readable visual representation. The machine-readable visual representation encodes map data corresponding to map tile of a geographic database. The method also comprises decoding the map data from the machine-readable visual representation. The method further comprises updating a local copy of the map tile stored in the vehicle based on the map data.

According to another embodiment, an apparatus for vehicle map data update comprises at least one processor, and at least one memory including computer program code for one or more computer programs, the at least one memory and the computer program code configured to, with the at least one processor, cause, at least in part, the apparatus to process sensor data captured by a sensor of a vehicle to detect a machine-readable visual representation. The machine-readable visual representation encodes map data corresponding to map tile of a geographic database. The apparatus is also caused to decode the map data from the machine-readable visual representation. The apparatus is further caused to update a local copy of the map tile stored in the vehicle based on the map data.

According to another embodiment, a non-transitory computer-readable storage for vehicle map data update medium carries one or more sequences of one or more instructions which, when executed by one or more processors, cause, at least in part, an apparatus to process sensor data captured by a sensor of a vehicle to detect a machine-readable visual representation. The machine-readable visual representation encodes map data corresponding to map tile of a geographic database. The apparatus is also caused to decode the map data from the machine-readable visual representation. The apparatus is further caused to update a local copy of the map tile stored in the vehicle based on the map data.

According to another embodiment, an apparatus for vehicle map data update comprises means for processing sensor data captured by a sensor of a vehicle to detect a machine-readable visual representation. The machine-readable visual representation encodes map data corresponding to map tile of a geographic database. The apparatus also comprises means for decoding the map data from the machine-readable visual representation. The apparatus further comprises means for updating a local copy of the map tile stored in the vehicle based on the map data.

According to another embodiment, a computer-implemented method for vehicle map data update comprises encoding map data into a machine-readable visual representation, wherein the map data corresponds to a map tile of a geographic database. The method also comprises providing the machine-readable visual representation, data for generating the machine-readable representation, or a combination thereof as an output. The machine-readable visual representation is presented on a display or an object that is within a field of view of a sensor of a vehicle. The sensor is configured to read the machine-readable visual representation to decode the map data to update or create a local copy of the map tile stored in the vehicle.

According to another embodiment, an apparatus for vehicle map data update comprises at least one processor, and at least one memory including computer program code for one or more computer programs, the at least one memory and the computer program code configured to, with the at least one processor, cause, at least in part, the apparatus to encode map data into a machine-readable visual representation, wherein the map data corresponds to a map tile of a geographic database. The apparatus is also caused to provide the machine-readable visual representation, data for generating the machine-readable representation, or a combination thereof as an output. The machine-readable visual representation is presented on a display or an object that is within a field of view of a sensor of a vehicle. The sensor is configured to read the machine-readable visual representation to decode the map data to update or create a local copy of the map tile stored in the vehicle.

According to another embodiment, a non-transitory computer-readable storage medium for vehicle map data update carries one or more sequences of one or more instructions which, when executed by one or more processors, cause, at least in part, an apparatus to encode map data into a machine-readable visual representation, wherein the map data corresponds to a map tile of a geographic database. The apparatus is also caused to provide the machine-readable visual representation, data for generating the machine-readable representation, or a combination thereof as an output. The machine-readable visual representation is presented on a display or an object that is within a field of view of a sensor of a vehicle. The sensor is configured to read the machine-readable visual representation to decode the map data to update or create a local copy of the map tile stored in the vehicle.

According to another embodiment, an apparatus for vehicle map data update comprises means for encoding map data into a machine-readable visual representation, wherein the map data corresponds to a map tile of a geographic database. The apparatus also comprises means for providing the machine-readable visual representation, data for generating the machine-readable representation, or a combination thereof as an output. The machine-readable visual representation is presented on a display or an object that is within a field of view of a sensor of a vehicle. The sensor is configured to read the machine-readable visual representation to decode the map data to update or create a local copy of the map tile stored in the vehicle.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for vehicle map data update are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although the various embodiments are discussed with respect to learning traffic signs, it is contemplated that the embodiments described herein are also applicable to any other type of road signs and or other road furniture that are observable or detectable from a roadway.

Figure 1:
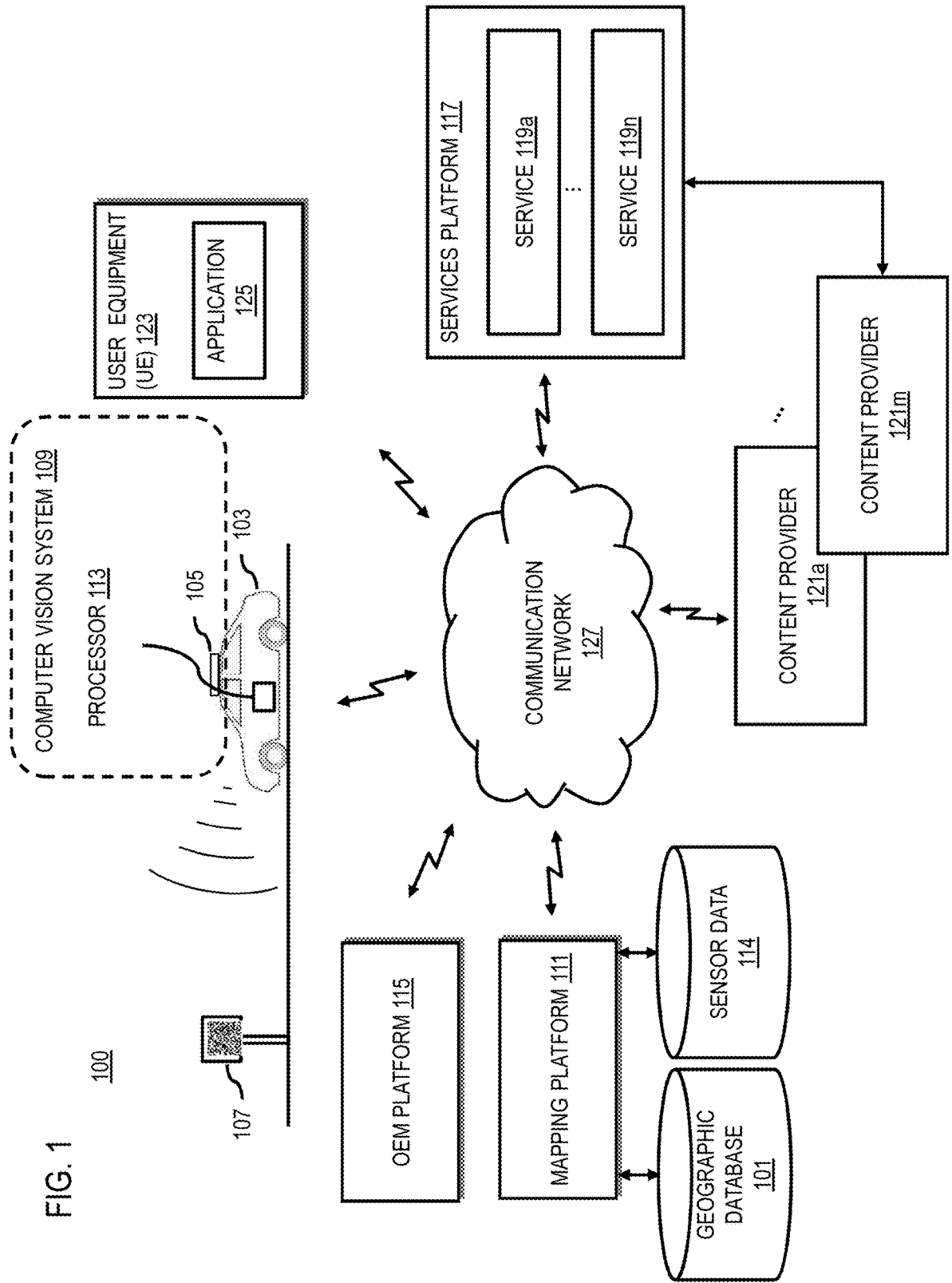
FIG. 1 is a diagram of a system capable of vehicle map data update, according to one embodiment.

FIG. 1 is a diagram of a system 100 capable of vehicle map data update, according to one embodiment. The automotive industry is focused on delivering safer, more comfortable and more efficient mobility solutions. The path towards these objectives include, for instance, automation of many functions currently performed by drivers as a way to reduce the burden asked of drivers in today's busy and highly regulated road environment, while improving reaction times and decision making. In one embodiment, digital maps (e.g., a geographic database 101) provide information complementary to on-board sensors and driver cognition to enhance autonomous or semi-autonomous driving functions implemented in a vehicle 103. For example, the geographic database 101 can be a source of road structure/topology data, navigation data, real-time data (e.g., traffic conditions, hazard warnings, road conditions, etc.), and/or the like that can be used as input into autonomous driving or navigation applications or services.

Historically, mapping strategies thus far have relied either on physical media to load map data into vehicles 103 such as discs, USB drives, etc., or is migrating to cloud-based over-the-air (OTA) solutions. OTA solutions have the advantage of enabling more frequent updates (e.g., potentially real-time updates) than physical media (e.g., usually updated every quarter, year, or even less frequently). However, putting full dependency on OTA solutions does not offer proper redundancy in case of communications failures. In addition, as communication via OTA technology comes at a cost, it may be cost prohibitive to share all of the data ideally communicated in a map.

Therefore, to support use-cases such as autonomous or semi-autonomous driving, map service providers and automobile manufacturers (e.g., Original Equipment Manufacturers (OEMs)) face significant technical challenges and resource constraints to providing map updates that does not depend on OTA technologies that may be unstable or interrupted, e.g., due to outdated communication equipment and/or networks, unstable power supplies, severe weather, signal inference, noise, etc., or unavailability in certain areas (e.g., dead zones), which can make autonomous driving unavailable because of out-of-date or inaccurate map data.

To address this problem, the system 100 of FIG. 1 introduces a capability to deliver map data updates via machine readable visual representations of the updates (e.g., a quick response (QR) code or equivalent) as physical signs, other objects, surfaces, etc. on roadways. For example, these signs, etc. can be variable message boards or physical static signboards to communicate key map data digestible via perception/camera input (or other equivalent vehicle sensors) to the vehicle 103. In one embodiment, these machine-readable visual representations (e.g., QR codes) are not re-directs to URLs with the map data, but rather the machine-readable visual representations contain the map data that is updated or changed directly. In this way, the data payload (e.g., the map data) of the machine-readable visual representation is encoded into the representation itself. In other words, the system 100 can encode and store map data into a machine-readable visual representation and provide the machine-readable visual representation as an output for vehicles 103 to receive or decode the map data from the representation without relying on communication networks or other OTA technologies. In one embodiment, the map data corresponds to a map tile of a geographic database. The machine-readable visual representation may include a barcode, a quick response (QR) code, a light array or matrix, one or more sequences of light pulses, infrared, laser, etc.

In one embodiment, the machine-readable visual representation is presented on a display 107 within a field of view of a sensor 105 of a vehicle 103. Such a display 107 may be a roadside signage, bulletin board, etc. with fixed or variable content. One advantage of a variable content display is to be updated with changes periodically or in real-time. In addition, the display 107 can show scrolling screens to allow for more than one machine-readable visual representation.

Figure 2A:
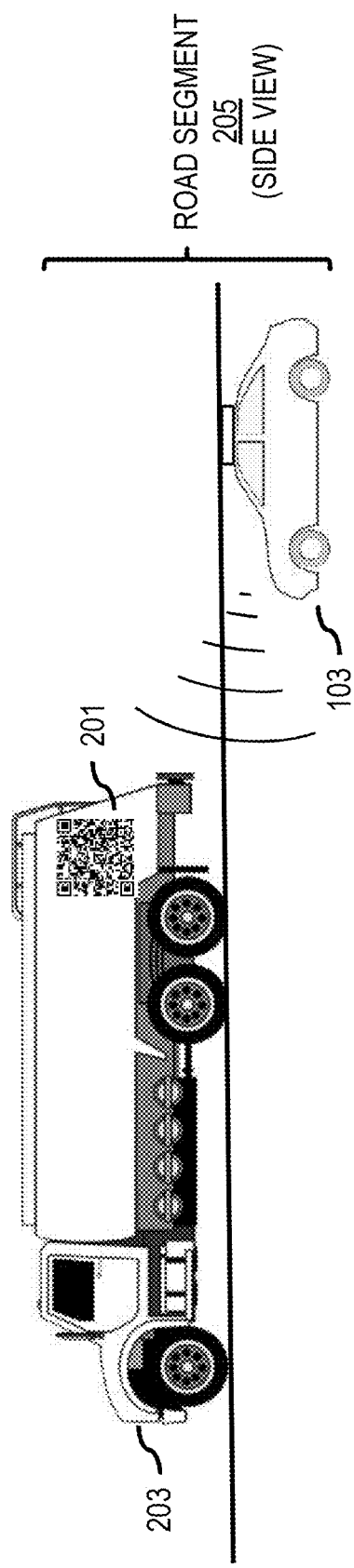
FIGS. 2A-2B are diagrams illustrating examples of a display/object showing a machine-readable visual representation, according to various embodiments.
Figure 2B:
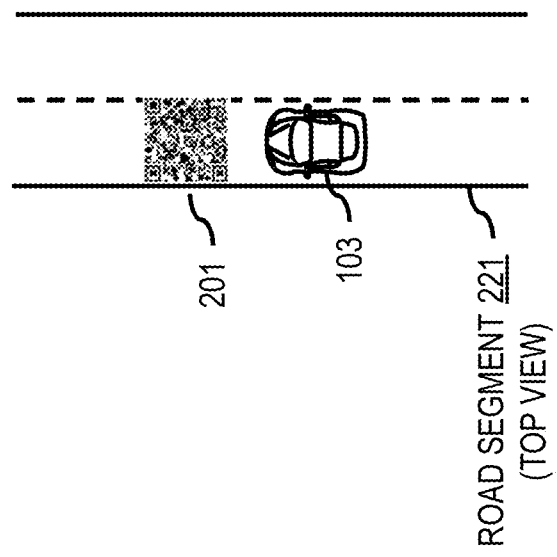

In another embodiment, the machine-readable visual representation is presented on an object within a field of view of a sensor 105 of a vehicle 103. By way of examples, the object may be a surface of another vehicle 103 travelling on the road, a road surface, a surface of a building or house on the roadside, etc. Such a surface may be a top, front, back, right, or left side surface of the object, when the sensing medium (e.g., human visible lights) cannot penetrate the object. FIGS. 2A-2B are diagrams illustrating examples of a display/object showing a machine-readable visual representation, according to various embodiments. For example, as shown in FIG. 2A, a machine-readable visual representation 201 is displayed on the left side of a truck 203 and viewable for the vehicle 103 travelling on a road segment 205. By way of example, the machine-readable visual representation 201a may be the QR code shown on the display 107 in FIG. 1. In another example, as shown in FIG. 2B, the machine-readable visual representation 201 is displayed on a surface of a road segment 221 and viewable for the vehicle 103 travelling on the road segment 221.

In other embodiments, when the sensing medium (e.g., inferred, electromagnetic radiation (EMR) with longer wavelengths, such as ultraviolet, x-rays, gamma radiation, etc.) can penetrate the object to read the machine-readable visual representation, the machine-readable visual representation can be placed on a bottom surface or anywhere inside the object.

The sensor 105 is configured to read the machine-readable visual representation using the above-described sensing medium, to decode the map data and to update or create a local copy of the map tile stored in the vehicle 103. In one embodiment, the sensor 105 works in a passive mode by receiving the sensing medium emitted or reflected by the display/object 107. For example, the sensor 105 receives visible lights from an outdoor digital signage displaying a QR code embedded with a map tile. In one embodiment, the sensor 105 works in an active mode by transmitting the sensing medium to the display/object 107. For example, the sensor 105 broadcasts electromagnetic radiation signals to outdoor signages within a threshold distance, e.g., a sign displaying a QR code embedded with a map tile, and the sensor 105 receives the reflected signals for decoding a machine-readable visual representation on or in a display/object. The active mode requires more resources and more expensive to operate than the passive mode.

In one embodiment, the map data (e.g., map tile updates) obtained by vehicles 103 from the display/object 107 can be the single source of map data, or as an alternate or backup for the map data obtained via communication systems, for example, to display navigation data in the vehicle 103. In one embodiment, by using map data retrieved by computer vision systems 109 of vehicles 103, the system 100 (e.g., via a mapping platform 111) can obtain enough sensor data to update map data (e.g., road construction data, traffic data, etc.) of the geographic database 101 and/or other equivalent map database.

The vehicles 103 may include regular vehicles, specialized mapping vehicles, or a combination thereof. In other words, there can be many more vehicles 103 operating in a road network capable to detecting and decoding the machine-readable visual representation on a display/object at any given time. Using regular vehicles is quicker and cheaper than using specialized mapping vehicles, because the penetration ratio of regular vehicles is higher than the penetration ratio of specialized mapping vehicles.

In one embodiment, depending on the number of participating vehicles 103 (e.g., thousands of vehicles 103 or more), the system 100 can learn and/or update the display/object 107 and their respective map data and attribute values (e.g., road construction data, traffic speed values, etc.) on the order of hours or minutes or in near real-time versus the quarterly updates (e.g., on the order of months) achieved using specialized mapping vehicles. There can be considerable variability in sensor performance capabilities, characteristics, setups, etc. between different models of vehicles 103 (e.g., even when the models are from the same manufacturer or OEM), thereby leading to potentially higher uncertainty and less accuracy. In addition, the vehicle speed and environment characteristics (e.g., weather, temperatures, visibility, etc.) affect completeness and/or accuracy of the map data retrieval as well. A target levels of completeness and/or accuracy may be above 90% or any other predetermined level) of the map data.

To address the technical challenges associated with detecting and decoding a machine-readable visual representation by vehicles 103 for map data update, the system 100 uses multiple sets of sensor data from multiple vehicles 103 traveling on the same road segment. In one embodiment, the system 100 decodes raw sensor data from the vehicles 103, map-matches the decoded data to road link records of the geographic database 101, and then spatially clusters the data into one or more map tiles according to attribute values, and then assembles a target map tile using shared map attribute values in the different sets of sensor data. In another embodiment, the system 100 map-matches map data from multiple vehicles 103 to road link records of the geographic database 101, spatially clusters the matched map data into one or more map tiles according to attribute values, and assembles a target map tile using shared map attribute values originated from different vehicles 103.

The machine-readable visual representations that are detected as close in space (e.g., within a threshold distance of each other) and have the same or similar properties are aggregated into a cluster, in order to extract shared map attribute values and determined as associated with an identical display/object 107. In one embodiment, a learned visual representation's property or characteristic (e.g., map data and attribute values indicated by the visual representation such as road construction, traffic, etc.) can then be determined based on the common values of the machine-readable visual representations in a cluster (e.g., a 90% common property, a consensus property, unanimous property, etc. of the cluster). This learned attribute value (e.g., road construction value) can be associated with one or more road links corresponding to or near the location of the display/object 107. In one embodiment, the location of the display/object 107 can be determined by an average/mean location of machine-readable visual representations in a cluster (or any other equivalent or similar function to a mean function).

It is noted that some of the embodiments rely on one vehicle accurately detecting and decoding a machine-readable visual representation on display/object detection using image recognition or other sensing media. Some other embodiments of the system 100 use data from multiple vehicles reading the same image recognition machine-readable visual representation, to provide sufficient accuracy or confidence for determining map data and attribute values (e.g., a road construction time frame), thereby creating or updating one or more map tiles in the local database of each participating vehicle 103.

By way of example, road construction map data or the like can be advantageously updated by the system 100, since detailed construction zone information can easily be communicated through a machine-readable visual representation, such as a start and a stop of a construction zone on a road segment, speed limits based on times of day and/or when construction workers present, lane reductions in a lane count and where lane changes occur, as well as restrictions in passing, truck lane usages, or for vehicles 103 to be aware of vehicles entering or exiting the road from specific worksite areas, for example.

Figure 3:
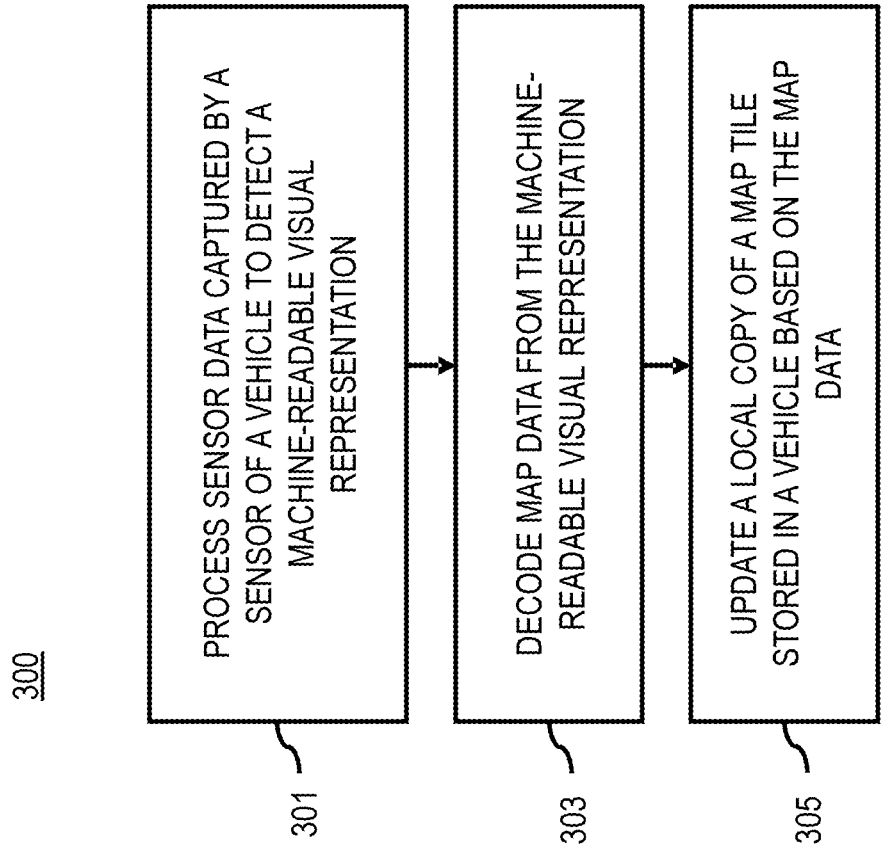
FIG. 3 is a flowchart of a process for updating vehicle map data, according to one embodiment.
Figure 11:
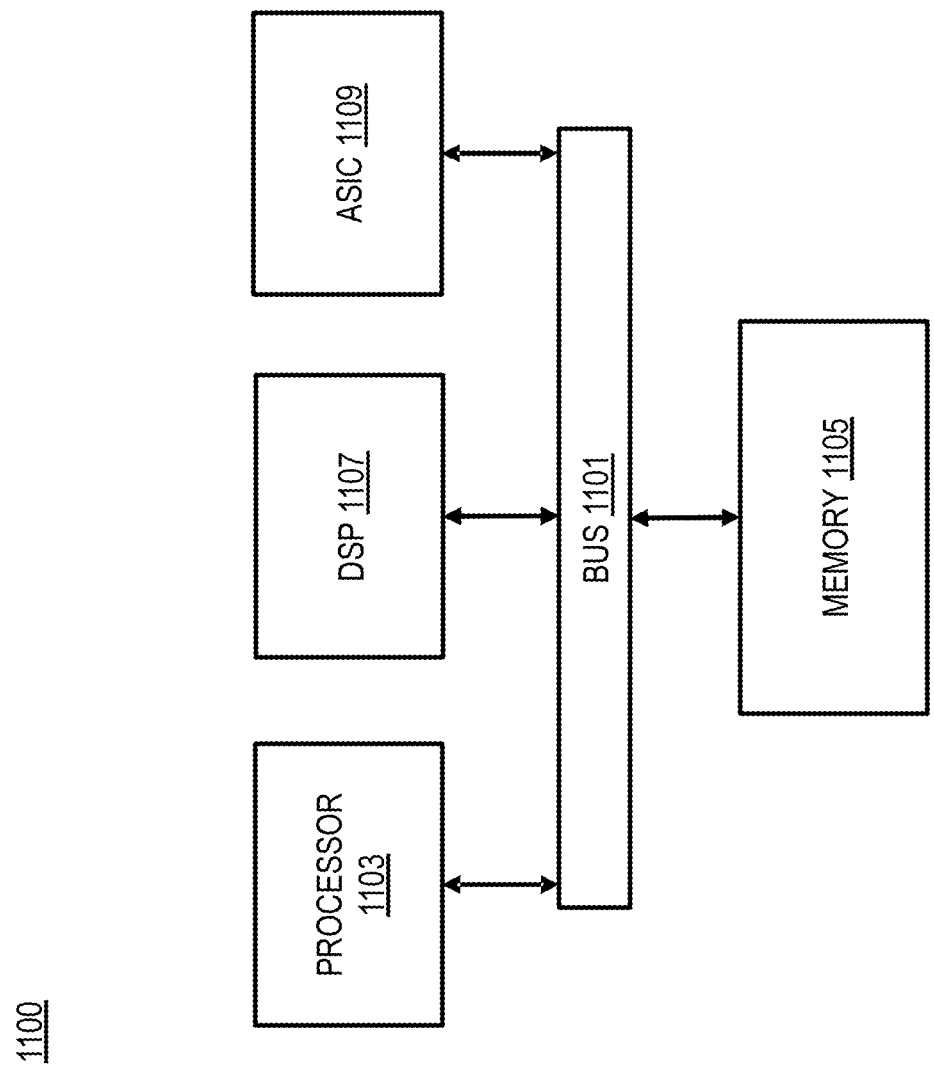
FIG. 11 is a diagram of a chip set that can be used to implement an embodiment.

In one embodiment, the vehicle 103 that detects and decodes machine-readable visual representations 201 has its own respective computer vision systems 109. FIG. 3 is a flowchart of a process for updating vehicle map data, according to one embodiment. In one embodiment, the computer vision system 109 and/or any of its modules (e.g., an image recognition software or processor 113 and sensors 105) may perform one or more portions of the process 300 and may be implemented in, for instance, a chip set including a processor and a memory as shown in FIG. 11. As such, the computer vision system 109 and/or the modules can provide means for accomplishing various parts of the process 300. Although the process 300 is illustrated and described as a sequence of steps, it is contemplated that various embodiments of the process 300 may be performed in any order or combination and need not include all of the illustrated steps. In step 301, the computer vision system 109 processes sensor data captured by a sensor of a vehicle 103 to detect a machine-readable visual representation.

The machine-readable visual representation encodes map data corresponding to a map tile of a geographic database. In step 303, the computer vision system 109 decodes the map data from the machine-readable visual representation. In step 305, the computer vision system 109 updates a local copy of the map tile stored in the vehicle based on the map data.

The computer vision system 109 can be any type of sign detection system known in the art or equivalent, for instance, comprising an image recognition software or processor 113 (e.g., machine learning or pattern matching models) and sensors 105 (e.g., optical sensors, radar sensors, laser sensors, inferred sensors, heat sensors, LiDAR sensors, location sensors, etc.) that can detect and recognize the display/object 107 and their attributes observed within the field of the vision of the sensors 105. In one embodiment, the software or processor 113 and the sensors 105 are separated yet communicating via a wired or wireless (e.g., short-range communication) network. In another embodiment, the software or processor 113 and the sensors 105 are integrated in one device that is built in or installed in the vehicle 103, such as a part of an instrument panel of the vehicle 103.

In another embodiment, the vehicle 103 uses a user device such as a user equipment (UE) 123 executing an application 125 capable of detecting and decoding machine-readable visual representations 201 using UE's sensors, and/or retrieving sensor data via a communication network 127, in place of or supplemental to the computer vision system 109.

In one embodiment, the computer vision system 109 configures the vehicle 103 to operate at an autonomy level among a plurality of autonomous levels based on an access to the one or more data elements granted by a subscription status of the vehicle 103, a user of the vehicle, or a combination thereof. In one embodiment, the subscription is set between a vehicle manufacturer and the vehicle 103. In another embodiment, the subscription is set between a service provider of the services 119 or a content provider 121 with a user of the vehicle.

In one embodiment, the map data includes one or more data elements, and the machine-readable visual representation further includes a priority of the one or more data elements with respect to an effect on an operation of the vehicle 103. By way of example, the map data decoded from the machine-readable visual representation 201 by vehicle 103 can include, but are not limited, to any of the following data fields: a display/object identifier, display/object type, latitude, longitude, heading, altitude, and/or side of road the display/object was detected, a map tile identifier, an area defined by the map tile, a tile size, the road data, information about the driving environment (e.g., the traffic sign data, the road work data, etc.), the point of interest data, the authentication data, etc. In one embodiment, the map data includes data elements defined and prioritized according to Table 1.

TABLE 1

| Data Description | Detailed Fields | Priority |
| --- | --- | --- |
| Tile ID | Tile identifier | 1 |
| Version ID | Version number of Tile | 1 |
| Administrative Data | Tile Size, Lat Long | 1 |
| Road Data | Road works [start location, end location, set of links in between start and end, road works start time, end time] Road_Name, Direction_of_Travel, Speed_Limit_Value_Cars, Speed_Limit_Value_Trucks, Elevation, Mile_Marker_Value, Administrative_Information | 1 |
| Lane Data | Number_of_Lanes, Lane_Boundaries, Lane_Marking_Type, Lane_Accessibility | 2 |
| Localization Data | Roadside_Barriers, Signs, Poles | 3 |
| POI Data | POI_Name, POI_Type, POI_Lat_Long | 4 |
| Authentication Data | Security_Key | 2 |

The above sample map data items have been prioritized. In this embodiment, the priority indicates its usefulness/effectiveness for autonomous driving. The priority may be used to resolve conflict in terms of what aspects of the data the vehicle 103 should update first for autonomous driving. For example, fields with priority 1 (e.g., Administrative Data, Road data) can be updated by the vehicle first. For example, Priority 1 data fields may be considered crucial for safety purposes or for vehicles using Level 2 autonomy driving. Priority 2 fields may offer more detailed data for Level 3 autonomous driving. Priority 3 fields (e.g., Localization Data) may be unique fields to certain vehicle types, and Priority 4 fields (e.g., POI data) are informational fields for the people in the vehicle 103. Using the data in Table 1, road works and direction of travel updates would be processed first by the vehicle 103 instead of a lane marking type update.

When two fields have the same priority, the on-route distances of the vehicle 103 to the locations of the map data items may be used to resolve the discrepancy. For example, a road works update takes a higher priority than direction of travel updates when the vehicle 103 is closer in driving distance to the road work change than to the direction of travel update.

The description of what data fields are minimally required for a vehicle to drive autonomously safely in an event of over-the-air data being unavailable, or updated onboard map data, can determined in many other ways. In another embodiment, the plurality of autonomous levels may be defined by the vehicle manufacturer, a regional, national, or international public entity, or a combination thereof. By way of example, the Society of Automotive Engineers (SAE) International published "Levels of Driving Automation" standard that defines the six levels of driving automation, from no automation to full automation. At Level 0: Automated system issues warnings and may momentarily intervene but has no sustained vehicle control. In one embodiment, the computer vision system 109 is at least subscribed to access the above-reference Administrative Data. In another embodiment, the computer vision system 109 is at least subscribed to access a map tile identifier, an area defined by the map tile, and a tile size embedded in the machine-readable visual representation 201.

At Level 1 ("hands on"): The driver and the automated system share control of the vehicle. In one embodiment, the computer vision system 109 is at least subscribed to access the above-reference Administrative Data, Road data, Lane data, and Authentication Data. In another embodiment, the computer vision system 109 is further subscribed to access information embedded in the machine-readable visual representation 201 about the driving environment required for a driver assistance system of either steering or acceleration/deceleration.

At Level 2 ("hands off"): The automated system takes full control of the vehicle (accelerating, braking, and steering). The driver must monitor the driving and be prepared to intervene immediately at any time if the automated system fails to respond properly. In one embodiment, the computer vision system 109 is at least subscribed to access the above-reference Administrative Data, Road data, Lane data, and Authentication Data. In another embodiment, the computer vision system 109 is further subscribed to access information embedded in the machine-readable visual representation 201 about the driving environment required for a driver assistance system of both steering and acceleration/deceleration.

At Level 3 ("eyes off"): The driver can safely turn their attention away from the driving tasks, e.g. the driver can text or watch a movie. In one embodiment, the computer vision system 109 is at least subscribed to access the above-reference Administrative Data, Road data, Lane data, and Authentication Data. In another embodiment, the computer vision system 109 is subscribed to access information embedded in the machine-readable visual representation 201 all driving environment required for a driver assistance system of all driving tasks, such that the human driver will respond appropriately to a request to intervene.

At Level 4 ("mind off"): no driver attention is ever required for safety, e.g. the driver may safely go to sleep or leave the driver's seat. In one embodiment, the computer vision system 109 is at least subscribed to access the above-reference Administrative Data, Road data, Lane data, Authentication Data, and Localization Data. In another embodiment, the computer vision system 109 is subscribed to access information embedded in the machine-readable visual representation 201 all driving environment required for a driver assistance system of all driving tasks, even if a human driver does not respond appropriately to a request to intervene.

At Level 5 ("steering wheel optional"): No human intervention is required at all. In one embodiment, the computer vision system 109 is at least subscribed to access the above-reference Administrative Data, Road data, Lane data, Authentication Data, Localization Data, and PI data. In another embodiment, the computer vision system 109 is subscribed to access information embedded in the machine-readable visual representation 201 all driving environment required for a driver assistance system of all driving tasks, under all roadway and environmental conditions.

There may be constraints in the size of map data that can be communicated via the machine-readable visual representation 201, and such constraints may be decreased or eliminated overtime as visual representation technology evolves. In addition, as onboard cameras increase pixel resolutions, which will allow for the machine-readable visual representation 201 to embedded with more map data.

In one embodiment, the one or more data elements are associated with one or more data encryption keys to restrict access to the one or more data elements. The one or more encryption keys is provided based on a subscription status of the vehicle, a user of the vehicle, or a combination thereof. For instance, a visual representation provider can dedicate all the data embedded in the machine-readable visual representation 201 to the public without authentication. By way of example, a public transport entity sets up a series of displays along a reversible high-occupancy road or highway to broadcast map data including lane traffic direction information of 6:00 a.m. to 10 a.m. two lanes inbound and one lane outbound while 2:30 p.m. to 7:30 p.m. two lanes outbound and one lane inbound.

In another embodiment, a visual representation provider can dedicate some of the data items to the public while requiring authentication for the remaining data items. For example, the authentication can be implemented via electronic toll transponders (e.g., smart tags or passes), subscription-based remote vehicle security and emergency services, reading the vehicle license plates, integrating the processor 113 or the UE 123 via a short-range communications link, etc. Alternatively or concurrently, the visual representation provider requires additional authentication via the Authentication Data in Table 1, such as an asymmetric cryptography algorithm with public and private keys. In yet another embodiment, a visual representation provider requires authentication for all of the data items, using the above-described authentication mechanisms.

In another embodiment, the software or processor 113 determines a communication network availability status of the vehicle 103 with a mapping platform 111 (e.g., operated by a map service provider) or an OEM platform 115 (e.g., operated by a vehicle manufacturer), which may be a regular or default source of the map data. When there is communication link in a vehicle traveling area, the map data can be transmitted from the mapping platform 111 through the OEM platform 115 to the vehicles 103, or directly from the mapping platform 111 to the vehicles 103, to update a local copy of the map tile stored in the vehicles 103. When there is no communication link available in the vehicle traveling area, the software or processor 113 processes the sensor data to detect the machine-readable visual representation to decode map data. By way of example, the software or processor 113 determines that the vehicle 103 is travelling in a dead zone with no communication signal and starts scanning for a display/object 107 for updating map data. Such dead zone may be a result of a lack of communication bandwidth or network coverage, or physical barriers such as tunnels, canyons, mountains, etc.

The system 100 may first deploy the displays/objects in high risk areas, such where there are known dead spots, or heavy road construction areas, etc.

In another embodiment, the software or processor 113 determines an identifier associated with the machine-readable visual representation, and compares the identifier to a cache of identifiers for a plurality of previously observed machine-readable visual representations to determine whether to perform the decoding of the map data, the updating of the local copy of the map tile, or a combination thereof. As a result, the computer vision system 109 does not waste resource to re-decode an identical machine-readable visual representation. For example, the identifier associated with the machine-readable visual representation is a globally unique identifier for machine-readable visual representation. As another example, the identifier associated with the machine-readable visual representation incorporates a display/object identifier and a version number of a set of map tile data.

In one embodiment, the vehicle 103 may use location information of the vehicle itself and position information such as offsets in meters from the vehicle's location to represent the display/object's location.

In other embodiments, rather decoding locally, the machine-readable visual representations 201 can be transmitted from the vehicles 103 to the mapping platform 111 through the OEM platform 115 or directly from the vehicles 103 to the mapping platform 111, to be decoded then the resulted map data is transmitted back to the vehicles 103 to update a local copy of the map tile stored in the vehicles 103. In one embodiment, the OEM platform 115 can aggregate machine-readable visual representations 201 and/or map data from the vehicles 103. The OEM platform 115 can pre-process (e.g., decode, anonymize, normalize, etc.) the machine-readable visual representations 201 before transmitting the processed machine-readable visual representations 201 to the mapping platform 111. In another embodiment, the mapping platform 111 can have connectivity to multiple OEM platforms 115 (e.g., each corresponding to a different vehicle manufacturer) to collect machine-readable visual representations 201.

In one embodiment, given machine-readable visual representations 201 and/or map data decoded therefrom from multiple vehicles 103 (or multiple OEM platforms 115) in a sensor database 114, the system 100 can cluster the machine-readable visual representations 201 and/or map data decoded therefrom according to locations and map data properties (e.g., traffic value, road construction type, etc.) to learn a newly placed display/object by a public entity (e.g., a highway authority) or a private entity (e.g., a road construction company) in near-real-time (e.g., within hours or shorter of data collection). A newly placed display/object is determined based on current clusters and a comparison to an earlier map such as a map of signs from the day before. For example, if the comparison indicates that a display/object 107 was not present in the earlier map, the system 100 can designate that display/object 107 as a newly placed display/object. The system 100 then identifies the road link to which the display/object 107 or property or value applies and updates the road link record of the geographic database 101 corresponding to the identified road link accordingly. In one embodiment, the display/object 107 data of the geographic database 101 can then be shared and used by the vehicles 103 for applications such as autonomous driving.

In some instance, the map attribute values from these different sources can conflict or differ significantly, thereby presenting technical challenges related to resolving these differences. To address these challenges, the system 100 introduces a capability to apply rules or criteria for determining the map attribute values (e.g., road, traffic, etc. attribute values) that the system 100 will display or use (e.g., with respect to presenting to a driver or controlling an autonomous vehicle) for a road link.

In one embodiment, the geographic database 101 may include map data updates (e.g., traffic speed limits) available from multiple sources including attribute values learned from machine-readable visual representations read and decoded according to the various embodiments described herein. For example, in addition to the map data and attributes (e.g., road constriction, traffic conditions, etc.), each road link record may also have a previously recorded map data value (e.g., High Definition (HD) map values determined when the geographic database 101 was created or last updated using traditional means such as from the quarterly updates generated from sensor data collected from the vehicles 103). In addition, other third-party road attribute data providers may also provide real-time map data updates (e.g., traffic data).

Another benefit of the displays/objects 107 is that physical signs present in the real world have precise GPS lat/long and elevation data encoded in the machine-readable visual representations 201, which creates a ground truth location available for the vehicles 103 to calibrate their relative locations for localization purposes, such as in the simultaneous localization and mapping (SLAM) techniques that construct or update a map of an unknown environment while simultaneously keeping track of a vehicle location within the map. When the system 100 deploys variable content displays/objects 107, a GPS location can be updated as plate shifts occurring in the earth easily.

Figure 4:
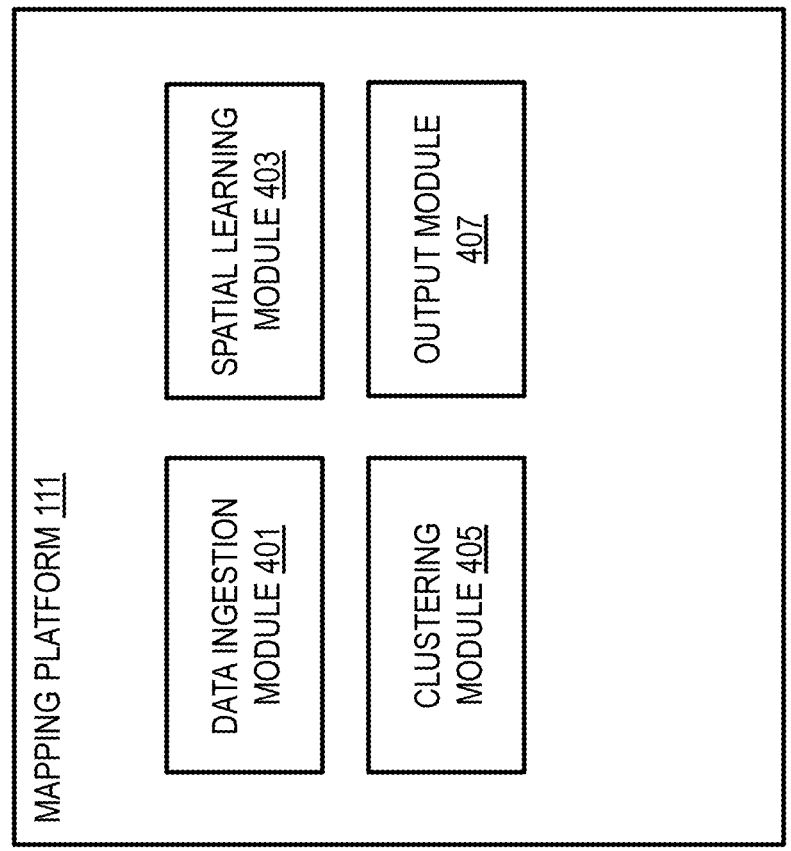
FIG. 4 is a diagram of the components of a mapping platform capable of vehicle map data update, according to one embodiment.

In one embodiment, as noted above, the mapping platform 111 can perform one or more functions related to vehicle map data update according to the embodiments described. FIG. 4 is a diagram of the components of the mapping platform 111, according to one embodiment. By way of example, the mapping platform 111 may include one or more components for vehicle map data update. In one embodiment, the mapping platform 111 includes a data ingestion module 401, spatial learning module 403, clustering module 405, and output module 407. It is contemplated that the functions of these components may be combined in one or more components or performed by other components with similar functionalities (e.g., the OEM platform 115, a services platform 117, any of the services 119*a*-119*n* of the services platform 117, etc.). The above presented modules and components of the mapping platform 111 can be implemented in hardware, firmware, software, or a combination thereof. Though depicted as a separate entity in FIG. 1, it is contemplated that the mapping platform 111 may be implemented as a module of any of the components of the system 100. In another embodiment, one or more of the modules 401-407 may be implemented as a cloud-based service, local service, native application, or combination thereof. The functions of the mapping platform 111 and modules 401-407 are discussed with respect to FIGS. 5-9 below.

Figure 5:
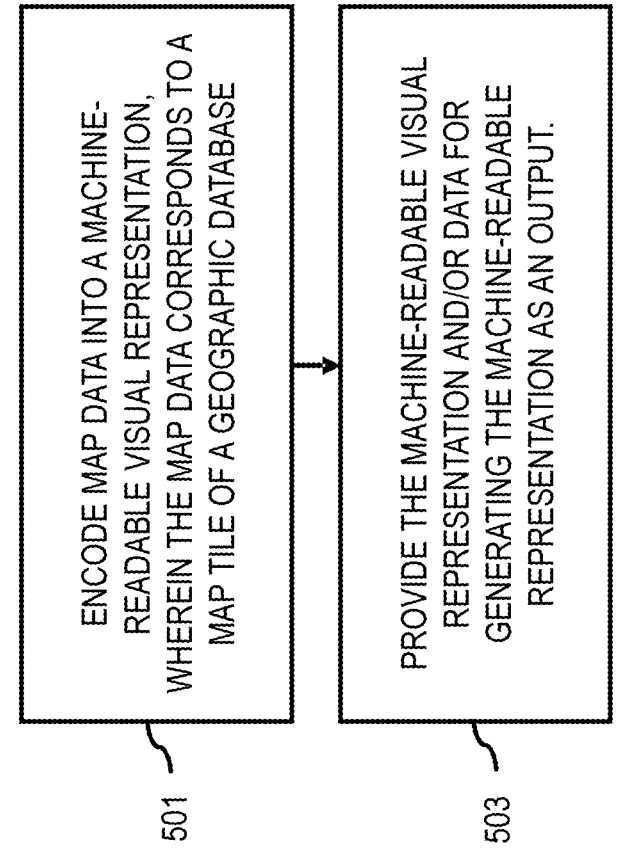
FIG. 5 is a flowchart of a process for deploying machine-readable representations embedded with map data, according to one embodiment.

FIG. 5 is a flowchart of a process 500 for deploying machine-readable representations 201 embedded with map data, according to one embodiment. In one embodiment, the mapping platform 111 and/or any of its modules 401-407 may perform one or more portions of the process 500 and may be implemented in, for instance, a chip set including a processor and a memory as shown in FIG. 11. As such, the mapping platform 111 and/or the modules 401-407 can provide means for accomplishing various parts of the process 500. In addition or alternatively, the OEM platform 115, services platform 117, and/or one or more of the services 119*a*-119*n* (also collectively referred to as services 119) may perform any combination of the steps of the process 500 in combination with the mapping platform 111, or as stand-alone components. Although the process 500 is illustrated and described as a sequence of steps, it is contemplated that various embodiments of the process 500 may be performed in any order or combination and need not include all of the illustrated steps In step 501, the mapping platform 111 or the data selection module 407 encodes map data into a machine-readable visual representation 201, and the map data corresponds to a map tile of a geographic database 101. As discussed above, the map data may include the following data fields: a display/object identifier, display/object type, latitude, longitude, heading, altitude, and/or side of road the display/object was detected, a map tile identifier, an area defined by the map tile, a tile size, the road data, information about the driving environment (e.g., the traffic sign data, the roadwork data, etc.), the point of interest data, the authentication data, etc.

In step 503, the mapping platform 111 or the output module 409 provides the machine-readable visual representation 201, data for generating the machine-readable representation 201, or a combination thereof as an output. As mentioned, the machine-readable visual representation 201 is presented on a display/object 107 that is within a field of view of a sensor 105 of a vehicle 103, and the sensor 105 is configured to read the machine-readable visual representation 201 to decode the map data to update or create a local copy of the map tile stored in the vehicle 103.

These displays/objects 107 can be delivered via a predetermined tile size resolution, or tile level. This resolution can be dependent on a frequency of displays/objects deployment related to actual tile boundaries. In one embodiment, the map tiles used herein may follow the Navigation Data Standard (NDS) tiling scheme. The size of an area covered by a map tile depends on the zoom level specified for the tile. The lower the zoom number, the more area the tile covers. For example, tiles for level 2 cover a broader region than tiles for level 10.

Figure 6A:
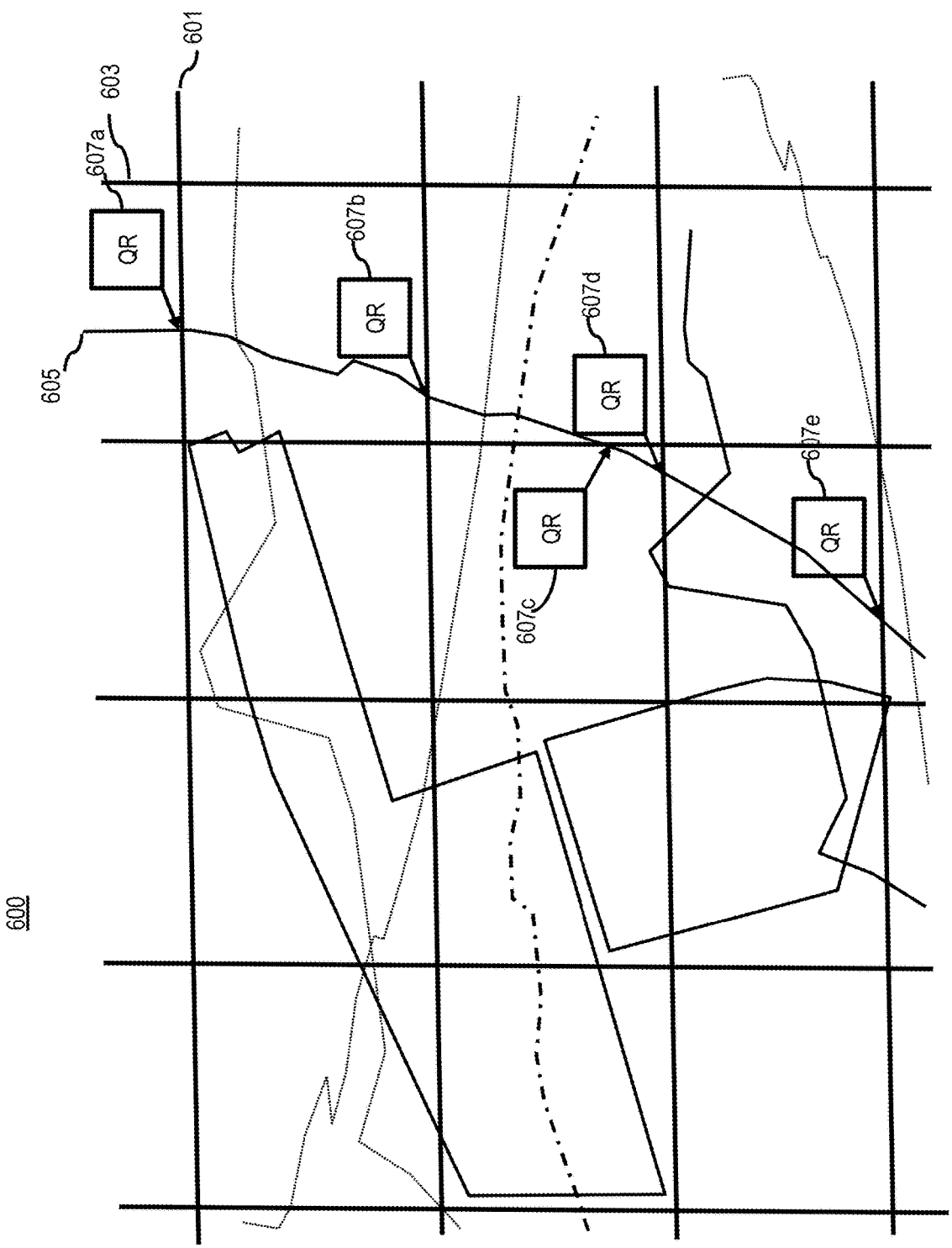
FIGS. 6A-6B are diagrams of tiles and displays/objects installed along a road, according to various embodiments.
Figure 6B:
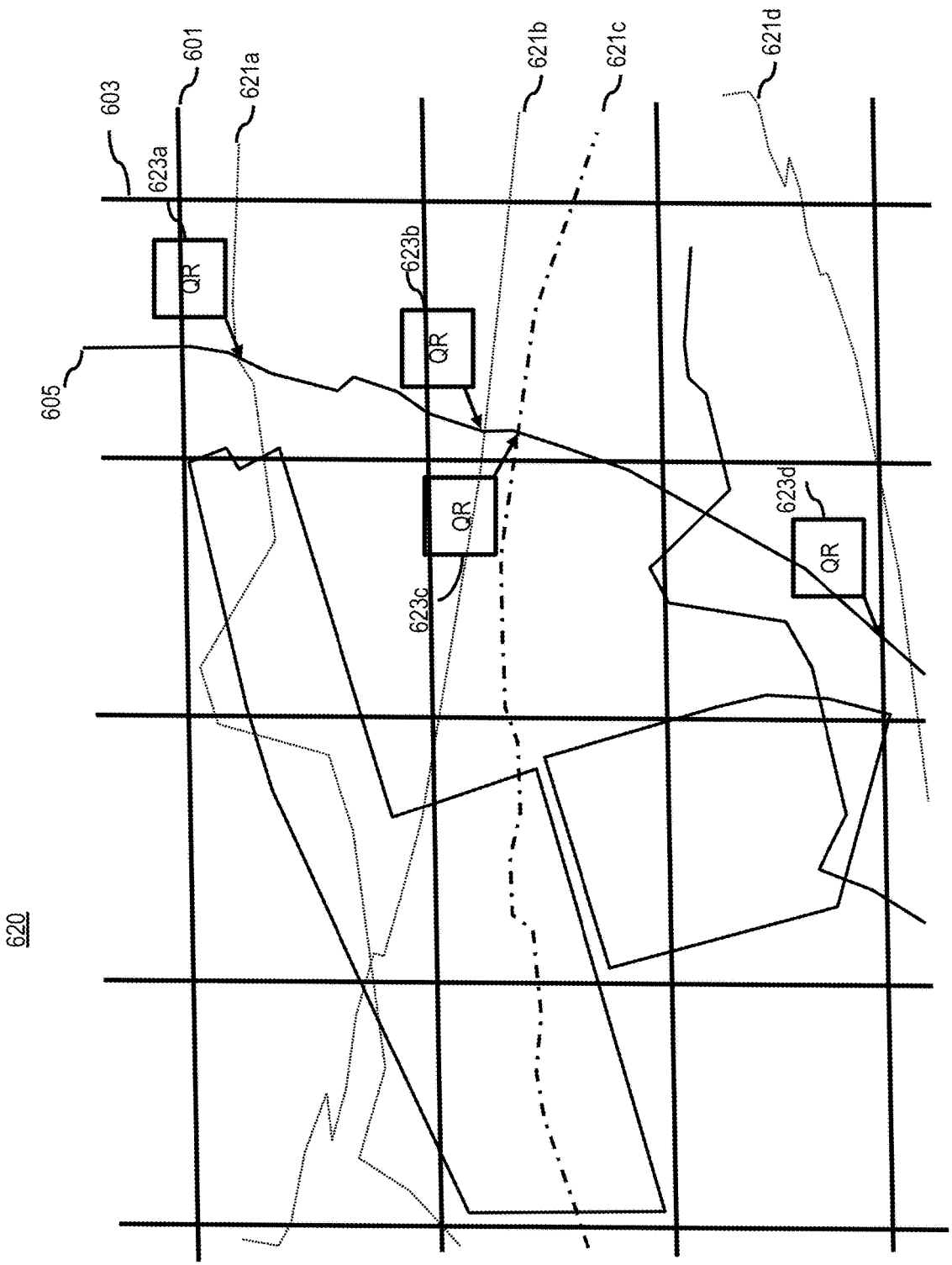

FIGS. 6A-6B are diagrams of tiles and displays/objects installed on a road, according to various embodiments. FIG. 6A is a diagram 600 of tiles defined by horizonal lines 601 and vertical lines 603 and displays/objects 607*a*-607*e* installed at tile boundaries on a road 605. The deployment of the displays/objects 607*a*-607*e* according to FIG. 6A is efficient since the clear transition at a tile boundary from one map tile to another.

FIG. 6B is a diagram 620 of tiles and displays/objects 623*a*-623*d* installed at intersections of the road 605 with major interstate highways and train tracks 621*a*-621*d* of transport networks. The deployment of the displays/objects 621*a*-621*d* according to FIG. 6B is beneficial since their exposures to more vehicles 103 travelling on the vehicle and train transport networks.

In one embodiment, the mapping platform 111 selects the display/object 107 based on the display/object 107 located in a geographic area that is determined to have no communication network availability, communication network availability below a threshold bandwidth, or a combination thereof. The display/object 107 may be a ground control point with a location determined as above a precision threshold. The display/object 107 is configured to present the machine-readable visual representation 201 statically, to present the machine-readable visual representation 201 variably in combination with at least one other machine-readable visual representation, or a combination thereof.

As discussed above, another technical challenge addressed by the system 100 and the mapping platform 111 is how to effectively determines from multiple readings of the same machine-readable visual representation of the display/object 107. In other words, the reporting consumer or OEM vehicles 103 have any state of art computer vision system 109 or image recognition software that can be propriety to OEMs. In one embodiment, the data ingestion module 401 receives raw machine-readable visual representation data and/or map data from vehicles 103 as they drive. These machine-readable visual representations and/or map data are then sent to the sensor database 114 (e.g., cloud) through the OEM platform 115 or directly to the sensor database 114 of the mapping platform 111 for processing by the data ingestion module 401. In one embodiment, raw machine-readable visual representation data for a predetermined period of time (e.g., for at least X hours) is collected or extracted from the sensor database 114. For example, the data ingestion module 401 can use X=24, this means the mapping platform 111 processes machine-readable visual representations to learn new signs and properties every 24 hours.

The data ingestion module 401 map matches the retrieved raw machine-readable visual representation data and/or map data based, for instance, on the digital map data or a road network stored in the geographic database 101. In other words, the data ingestion module 401 associates the machine-readable visual representations and/or map data to a road network so that each machine-readable visual representation and/or map data can be link to a particular road link or road segment of the road network. In one embodiment, for map matching, the location data in each machine-readable visual representation and/or map data (e.g., latitude, longitude, speed, heading, and/or the like from vehicles 103) are stored. It is contemplated that any map-matching process, means, algorithm, etc. (e.g., path-based map matching) known in the art or equivalent can be used in embodiments of the process 400 to generate machine-readable visual representations 201.

The spatial learning module 403 can then use the image recognition and/or decoding results from these computer vision systems 109 to learn map data and their respective properties to use in various uses cases (e.g., map updates, driver aid, autonomous driving, etc.). Because of the high uncertainty with image recognition, the mapping platform 111 or clustering module 405 uses multiple reading of the same machine-readable visual representation from different vehicles 103 to cluster the machine-readable visual representation readings and/or map data decoded therefrom.

By way of example, any density-based clustering algorithm (e.g. DB-SCAN) or equivalent known in the art can be used. To perform the clustering, the clustering module 405 can designate default clustering parameters. The clustering parameters can include, but are not limited to: a minimum number of machine-readable visual representations per cluster, distance threshold for a machine-readable visual representation to be included in a cluster, and/or the like. For example, the clustering module 405 can require at least three machine-readable visual representations that are within a distance threshold of 15 m to create a cluster. In other words, clustering aggregates the machine-readable visual representation readings that are close in space and have the same or similar properties (e.g. sign value, side of the road, etc.).

In one embodiment, the output module 407 processes the clustered data (e.g., consisting of one or more clusters corresponding respectively to a machine-readable visual representation 201), and decodes a machine-readable visual representation 201 into map data and other properties and a location of the machine-readable visual representation 201. In one embodiment, the location is the mean location of machine-readable visual representations that are in a cluster. In addition, similar learned clusters that are within a cluster distance threshold (e.g., within 20 m) and are located on the same road link or adjacent links can be merged.

In one embodiment, the spatial learning module 403 can send the clustered data and/or the map data to the geographic database 101 or equivalent for storage. In one embodiment, the clustered data and/or the map data can be stored in a separate layer of the geographic database 101 to distinguish the data from other sources of sign data or map data updates that may already be stored in the geographic database 101 (e.g., HD road attribute data) or available from external third-parties (e.g., services platform 117, services 119a-119n, content providers 121a-121m, etc.). In one embodiment, the geographic database 101 or other database where the clustered data and/or the map data is stored can be queried to determine if a given display/object 107 is newly placed on the road.

In one embodiment, the mapping platform 111 can also receive or have access to other sources (e.g., third-party sources) of pre-processed alternate traffic sign data for one or more areas mapped in the geographic database 101. In other words, the mapping platform 111 could also get pre-processed sign data (e.g., already map matched and clustered) from other near-real-time traffic sign services (e.g., a services platform 117, services 119a-119n, content providers 121a-121m, etc.).

As described above, in some embodiments, the mapping platform 111 may have access to multiple sources of map data. These sources can include, but are not limited to: (1) the map data decoded according to the embodiments described above; (2) map data generated using traditional means (e.g., fleets of mapping vehicles) during the creation of, for instance, the traditional HD map data stored in the geographic database 101; (3) third-party providers of real-time map data; and/or the like. As used herein, the term "alternate" map data refers to any map data or source of map data that is not the map data decoded from clustering machine-readable visual representations as described in the various embodiments. In addition, the alternate data sources can include both sources internal to the geographic database 101 (e.g., default map data or attributes such as those stored in HD map data of the geographic database 101 for a given road link separate from the learned map data stored in the geographic database 101 for the same road link) as well as sources external to the geographic database 101 (e.g., third party providers such as the services platform 117, services 119, and/or content providers 121).

Figure 7:
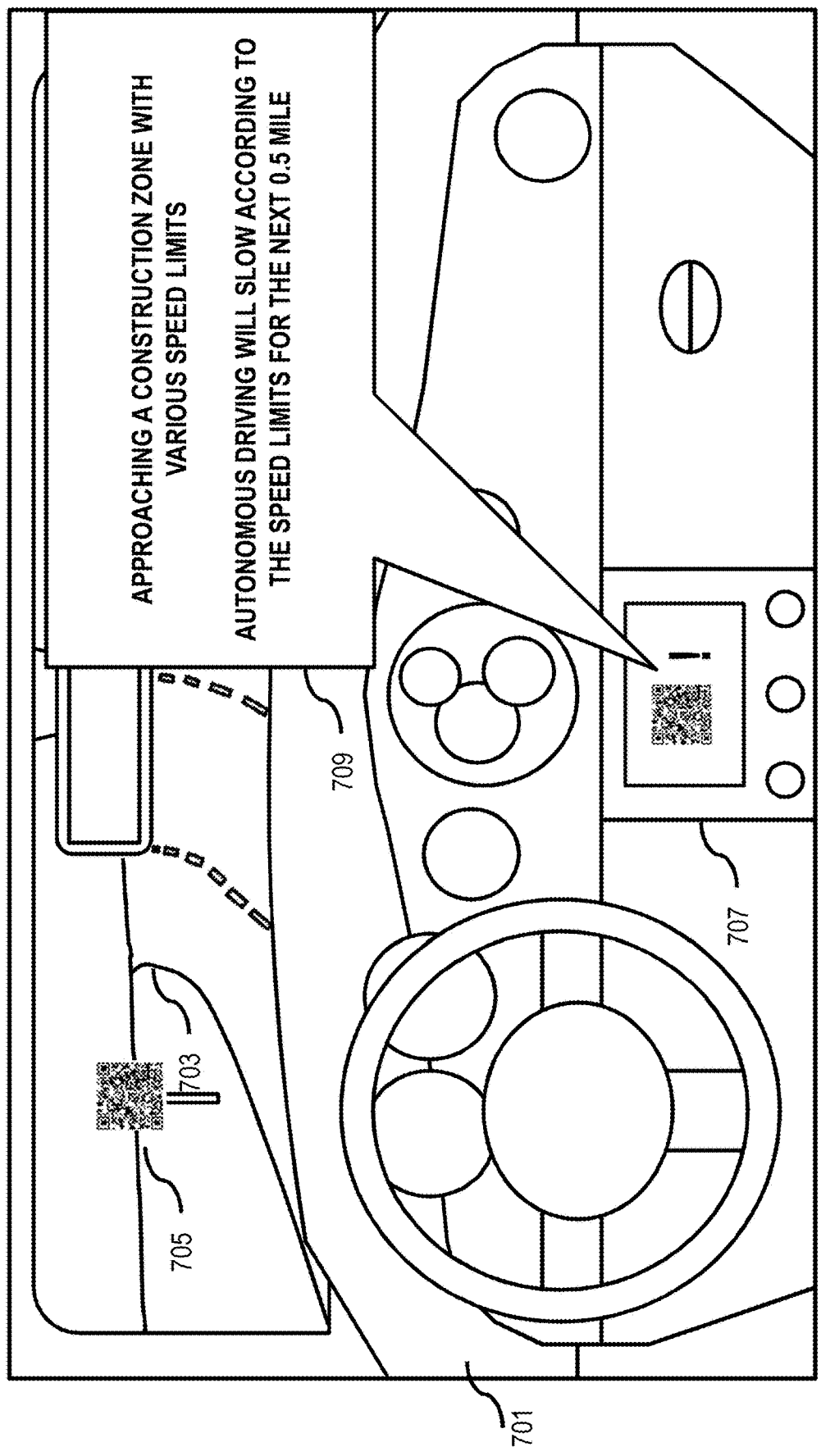
FIG. 7 is a diagram illustrating an example of using the decoded map data for autonomous driving, according to one embodiment.

FIG. 7 is a diagram illustrating an example of using the decoded map data for autonomous driving, according to one embodiment. In the example of FIG. 7, a vehicle 701, like vehicle 103 for example, is driving autonomously and approaches a road segment 703 with a display/object 705 indicating a construction zone. In this jurisdiction, a construction zone sign 705 indicates corresponding speed limits around the area. The vehicle 701 has received machine-readable visual representations and/or decoded map data from the area and the corresponding speed limits around the area. Accordingly, as the vehicle approaches the road segment 703, the vehicle 701 can present the traffic speed limits for the road segment 703 to the driver or passengers of the vehicle 701. In addition, the vehicle 701 can modify its autonomous driving accordingly (e.g., automatically slowing down according to the speed limits). A navigation system 707 of the vehicle 701 can present an alert 709 that the vehicle 701 is approaching a construction zone with various speed limits, and that the vehicle 701 will be slowing down accordingly for the length of the corresponding road segment 703 (e.g., 0.5 miles).

Figure 8:
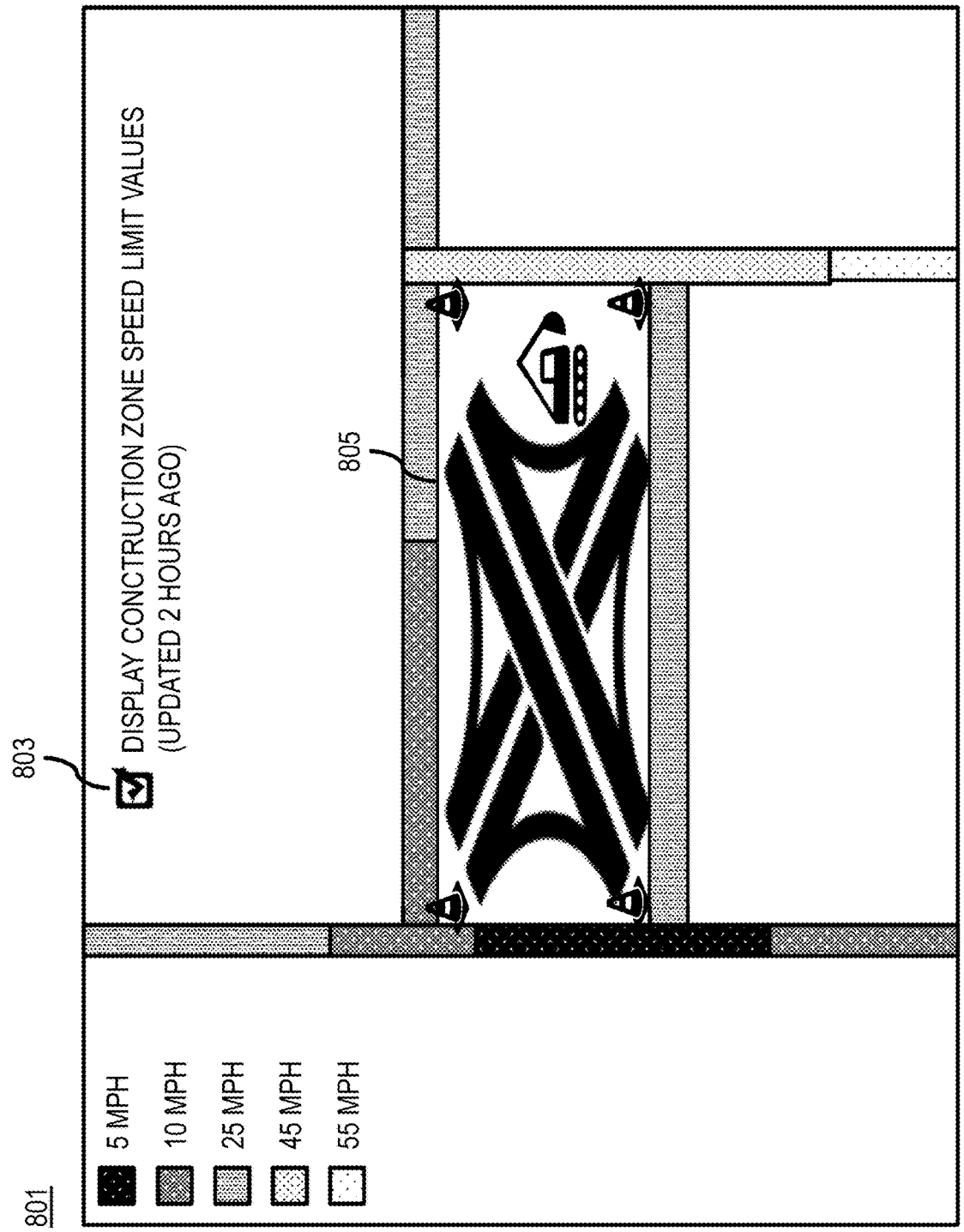
FIG. 8 is a diagram of a mapping user interface presenting detailed map data, according to one embodiment.

For example, FIG. 8 is a diagram of a mapping user interface (UI) 801 presenting detailed map data, according to one embodiment. In the example of FIG. 8, a user has selected an option 803 to display the speed limit values around a construction zone 805. Based on this selection, a user device (e.g., a navigation system of the vehicle, a user device such as a user equipment (UE) 123 executing an application 125 capable of presenting the mapping UI 801. The learned speed limits values are based on the machine-readable visual representation 201 collected from the vehicle 701 and optionally other vehicles 103 that are traveling in the same area as the vehicle 701 of the current requesting user. The UE 123 or the navigation system of the vehicle 103 then uses the map data to generate visual representations of the traffic speed limit values overlaid on the representations of the corresponding road links of interest. As shown in UI 801, a color coding system is used to indicate learned speed limit values (e.g., from 5 mph to 55 mph) for each displayed road link around the construction zone.

Returning to FIG. 1, as shown, the system 100 includes a consumer or OEM vehicle 103 with connectivity to the mapping platform 111 and/or OEM platform 115 for providing machine-readable visual representations, determining learned traffic sign data, and/or using the learned traffic sign data according to the various embodiments described herein. In one embodiment, the vehicle 103 includes the computer vision system 109 with sensors 105 and an in-vehicle processor 113 for generating machine-readable visual representations for vehicle map data update. In some use cases, with respect to autonomous, navigation, mapping, and/or other similar applications, the in-vehicle processor 113 can detect traffic signs and their properties from input sensor data and generate.

In one embodiment, the mapping platform 111 can include a similar supervised learning mechanism that can include one or more feature detection models such as, but not limited to, neural networks, SVMs, decision trees, etc. to learn signs and sign properties from clustered machine-readable visual representations and make confidence calculations regarding the learned signs and/or properties. For example, the supervise learning mechanism can be based on a neural network such as a traditional convolutional neural network which consists of multiple layers of collections of one or more neurons (e.g., processing nodes of the neural network) which are configured to process input feature sets.

In one embodiment, the mapping platform 111, vehicle 103, UE 123, and/or other end user devices also have connectivity or access to the geographic database 101 which stores representations of mapped geographic features to facilitate autonomous driving and/or other mapping/navigation-related applications or services. The geographic database 101 can also store learned traffic sign data, as well as rules or filters for post-processing the learned traffic sign data and/or the machine-readable visual representations used for learning the traffic sign data according to the various embodiments described herein.

In one embodiment, the mapping platform 111, OEM platform 115, vehicle 103, UE 123, etc. have connectivity over the communication network 127 to the services platform 117 that provides one or more services 119 related to vehicle map data update (e.g., third-party traffic sign data services). By way of example, the services 119 may be third party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the mapping platform 111, OEM platform 115, services platform 117, and/or other components of the system 100 may be platforms with multiple interconnected components. The mapping platform 111, OEM platform 115, services platform 117, etc. may include multiple servers, intelligent networking devices, computing devices, components and corresponding software for providing parametric representations of lane lines. In addition, it is noted that the mapping platform 111, OEM platform 115, computer vision system 109, etc. may be separate entities of the system 100, a part of the one or more services 119, a part of the services platform 117, or included within the UE 123 and/or vehicle 103.

In one embodiment, content providers 121a-121m (collectively referred to as content providers 121) may provide content or data (e.g., including learned traffic sign data or other geographic data) to the geographic database 101, the mapping platform 111, the computer vision system 109, the services platform 117, the services 119, the UE 123, the vehicle 103, and/or an application 125 executing on the UE 123. The content provided may be any type of content, such as map content, textual content, audio content, video content, image content, etc. In one embodiment, the content providers 121 may provide content that may aid in the detecting and classifying of traffic signs and their properties from sensor data (e.g., image data), and estimating the confidence and/or accuracy of the detected features. In one embodiment, the content providers 121 may also store content associated with the geographic database 101, mapping platform 111, OEM platform 115, computer vision system 109, services platform 117, services 119, UE 123, and/or vehicle 103. In another embodiment, the content providers 121 may manage access to a central repository of data, and offer a consistent, standard interface to data, such as a repository of the geographic database 101.

In one embodiment, the UE 123 and/or vehicle 103 may execute a software application 125 to collect, encode, and/or decode machine-readable visual representations for automated vehicle map data update according the embodiments described herein. By way of example, the application 125 may also be any type of application that is executable on the UE 123 and/or vehicle 103, such as autonomous driving applications, mapping applications, location-based service applications, navigation applications, content provisioning services, camera/imaging application, media player applications, social networking applications, calendar applications, and the like. In one embodiment, the application 125 may act as a client for the mapping platform 111, OEM platform 115, services platform 117, and/or services 119 and perform one or more functions associated with vehicle map data update.

By way of example, the UE 123 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 123 can support any type of interface to the user (such as "wearable" circuitry, etc.). In one embodiment, the UE 123 may be associated with the vehicle 103 or be a component part of the vehicle 103.

In one embodiment, the UE 123 and/or vehicle 103 are configured with various sensors for generating or collecting environmental sensor data (e.g., for processing by the in-vehicle processor 113 and/or mapping platform 111), related geographic data, etc. including but not limited to, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 123 and/or vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 123 and/or vehicle 103 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 123 and/or vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 127 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, OEM platform, services platform 117, services 119, UE 123, vehicle 103, and/or content providers 121 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
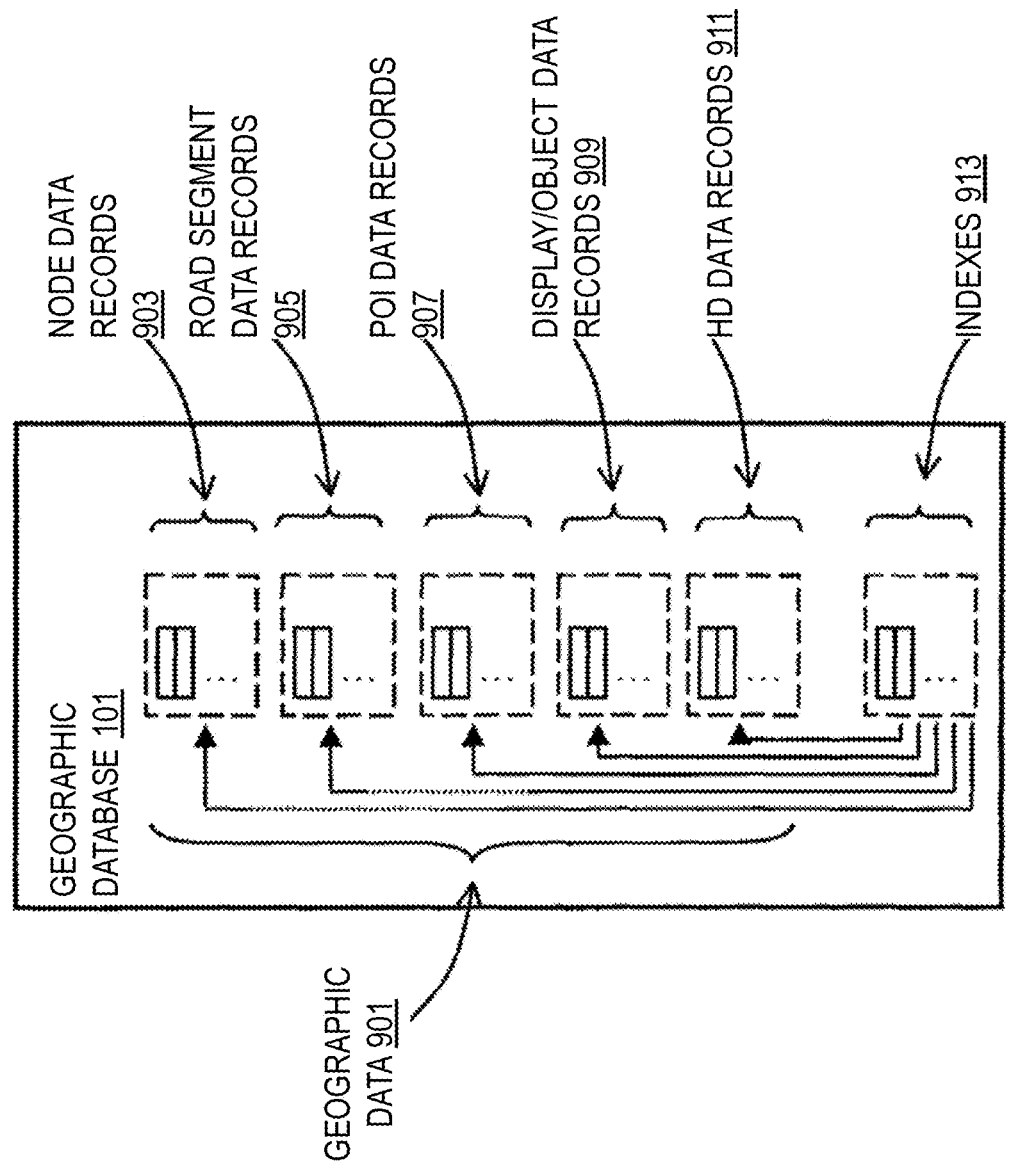
FIG. 9 is a diagram of a geographic database, according to one embodiment.

FIG. 9 is a diagram of a geographic database 101, according to one embodiment. In one embodiment, the geographic database 101 includes geographic data 901 used for (or configured to be compiled to be used for) mapping and/or navigation-related services, such as for video odometry based on the parametric representation of lanes include, e.g., encoding and/or decoding parametric representations into lane lines. In one embodiment, the geographic database 101 include high resolution or high definition (HD) mapping data that provide centimeter-level or better accuracy of map features. For example, the geographic database 101 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road, and to determine map data updates (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 101 is stored as a hierarchical or multi-level tile-based projection or structure. More specifically, in one embodiment, the geographic database 101 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 101 includes node data records 903, road segment or link data records 905, POI data records 907, display/object data records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 101. In one embodiment, the indexes 913 may be used to quickly locate data without having to search every row in the geographic database 101 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 907. The geographic database 101 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 101 can also include display/object data records 909 for storing machine-readable visual representations and map data decoded from the visual representations and their respective properties. In addition, the display/object data records 909 can store post-processing rule sets for correcting and/or reducing the uncertainties in the display/object data decoded from clustered machine-readable visual representations. The display/object data records 909 can also store data selection rules (e.g., in a map data extension layer) for selecting from among multiple sets of readings of a machine-readable visual representation. The display/object data records 909 can also store confidence or accuracy determinations for the decoded map data. By way of example, the display/object data records 909 can be associated with one or more of the node records 903, road segment records 905, and/or POI data records 907 to support uses cases such as enhanced mapping UIs, autonomous driving, dynamic map updates, etc. In one embodiment, the display/object data records 909 are stored as a data layer of the hierarchical tile-based structure of the geographic database 101 according to the various embodiments described herein. In one embodiment, the geographic database 101 can provide the display/object data records 909 to automatic vehicle map data update using clustered machine-readable visual representations.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 101 can be maintained by the content provider 121 in association with the services platform 117 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle (e.g., vehicle 103 and/or UE 123) along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 103 or UE 123. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing vehicle map data update using clustered machine-readable visual representations may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
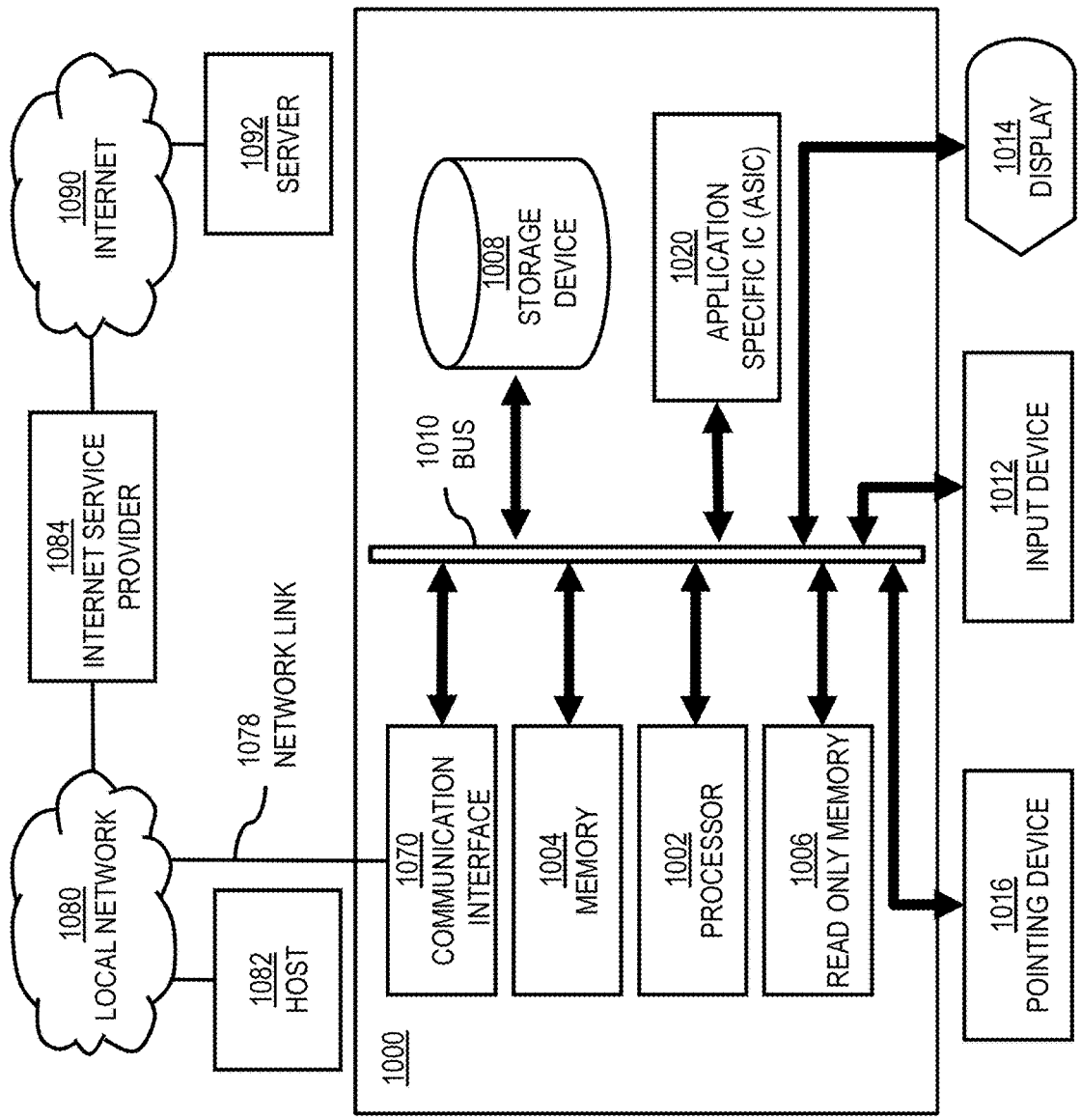
FIG. 10 is a diagram of hardware that can be used to implement an embodiment.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to provide vehicle map data update as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing vehicle map data update.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing vehicle map data update. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing vehicle map data update. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing vehicle map data update, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless devices, such as mobile computers like vehicle infotainment system, the communications interface 1070 includes a radio band electromagnetic transmitter and receiver called a radio transceiver. In certain embodiments, the communications interface 1070 enables connection to the communication network 105 for providing vehicle map data update to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide vehicle map data update as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing vehicle map data update.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide vehicle map data update. The memory 1105 also stores the data associated with or generated by the execution of the inventive steps.

Figure 12:
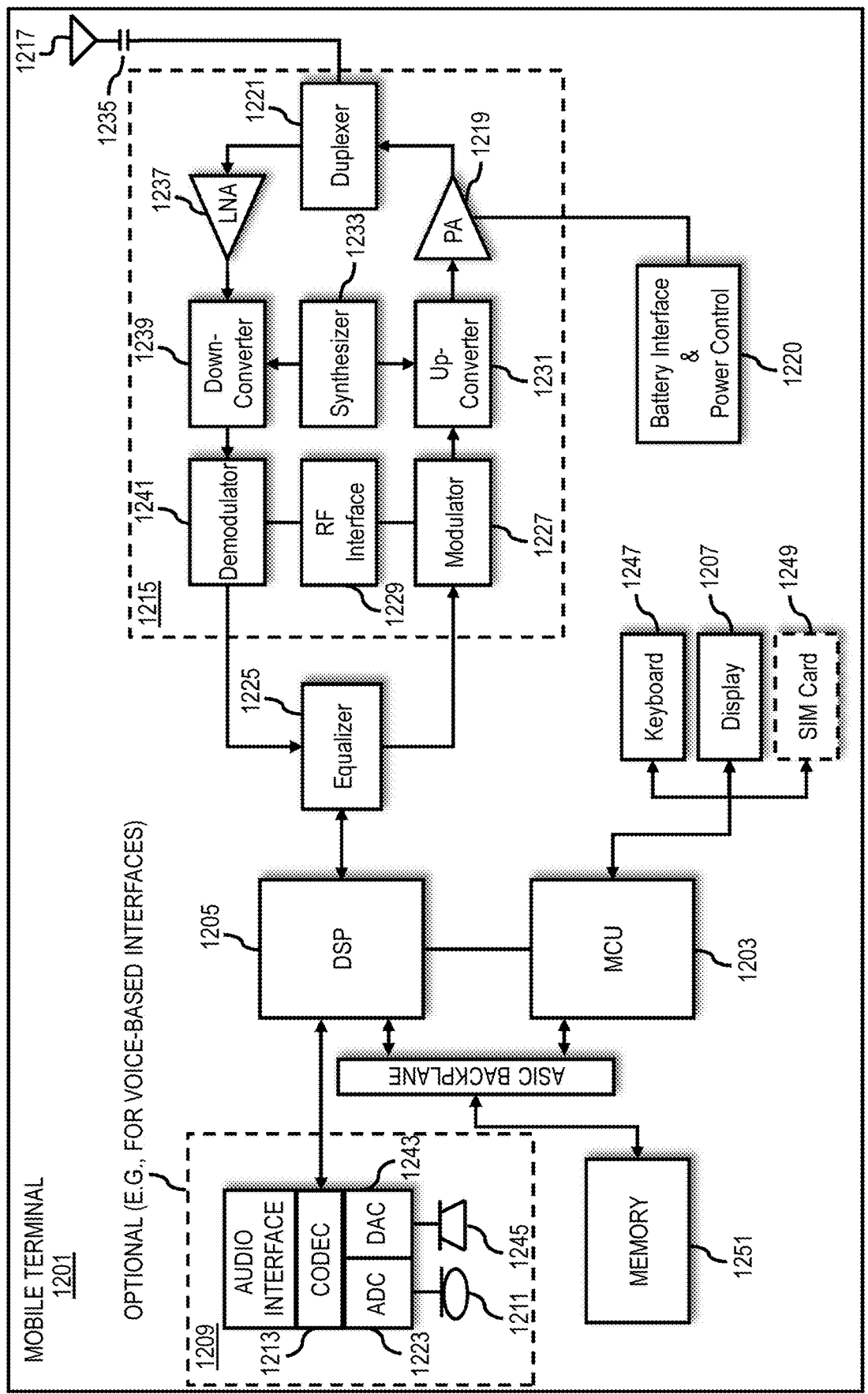
FIG. 12 is a diagram of a mobile terminal (e.g., handset or other mobile device, like a vehicle or part thereof) that can be used to implement an embodiment.

FIG. 12 is a diagram of exemplary components of a mobile terminal 1201 (e.g., mobile computers such as vehicle infotainment system, vehicle embedded system, smartphones, etc.) for communications, which is capable of operating in the system of FIG. 1, according to one embodiment. In some embodiments, mobile terminal 1201, or a portion thereof, constitutes a means for performing one or more steps of providing vehicle map data update. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile computer or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile computer or a similar integrated circuit in network device (e.g., a cellular network device or data other network devices).

Pertinent internal components of the mobile terminal include a Main Control Unit (MCU) 1203, a Digital Signal Processor (DSP) 1205, and a receiver/transmitter unit. In one embodiment, wherein voice-based interaction and/or communications are supported at the mobile terminal, the mobile terminal may also include a microphone gain control unit and a speaker gain control unit. A main display unit 1207 provides a display to the user in support of various applications and mobile terminal functions that perform or support the steps of providing vehicle map data update. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. In embodiments supporting voice-based interactions and/or communications, an audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station (e.g., data and/or voice communications), which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, data to support providing vehicle map data update is formatted into network packets (e.g., Internet Protocol (IP) packets) for transmission using one or more network transmission protocol (e.g., a cellular network transmission protocol described in more detail below). In one embodiment, the network packets include control information and payload data, with the control information specifying originating/destination network addresses, error control signals, signals for reconstructing the user data from the packets, and/or other related information. In embodiments supporting voice-based interaction and/or communications, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech recognition, speech encoding, channel encoding, encrypting, and interleaving.

In one embodiment, the processed network packets and/or voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission through the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The local base station or similar component then forwards data or network packets to a gateway server (e.g., a gateway to the Internet) for connectivity to network components used for providing vehicle map data update. In embodiments supporting voice-based interactions and/or communications, voice signals may be forwarded from the local base station to a remote terminal which may be another mobile computer, cellular telephone, and/or any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide vehicle map data update. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details (e.g., data and/or voice subscriptions), and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. An apparatus for providing a map data update comprising:
    at least one processor; and
    at least one memory including computer program code for one or more programs,
    the at least one memory and the computer program code configured to, with the at least one processor, cause the apparatus to perform at least the following,
        process sensor data captured by a sensor of a vehicle to detect a machine-readable visual representation, wherein the machine-readable visual representation encodes map data corresponding to a map tile of a geographic database;
        decode the map data from the machine-readable visual representation; and
        update a local copy of the map tile stored in a device associated with the vehicle based on the map data.

2. The apparatus of claim 1, wherein the map data includes one or more data elements, and wherein the machine-readable visual representation further includes a priority of the one or more data elements with respect to an effect on an operation of the vehicle.

3. The apparatus of claim 2, wherein the apparatus is further caused to:
    configure the vehicle to operate at an autonomy level among a plurality of autonomous levels based on an access to the one or more data elements granted by a subscription status of the vehicle, a user of the vehicle, or a combination thereof.

4. The apparatus of claim 3, wherein the apparatus is further caused to:
    determine a communication network availability status of the vehicle,
    wherein the processing of the sensor data to detect the machine-readable visual representation is initiated based on the communication network availability status.

5. The apparatus of claim 1, wherein the apparatus is further caused to:
    determine an identifier associated with the machine-readable visual representation;
    compare the identifier to a cache of identifiers for a plurality of previously observed machine-readable visual representations to determine whether to perform the decoding of the map data, the updating of the local copy of the map tile, or a combination thereof.

6. A method for providing a map data update comprising:
encoding map data into a machine-readable visual representation, wherein the map data corresponds to a map tile of a geographic database; and
providing the machine-readable visual representation, data for generating the machine-readable representation, or a combination thereof as an output,
wherein the machine-readable visual representation is presented on a display or an object that is within a field of view of a sensor of a vehicle,
wherein the sensor is configured to read the machine-readable visual representation to decode the map data and to update or create a local copy of the map tile stored in a device associated with the vehicle.

7. The method of claim 6, wherein the map data includes one or more data elements, and wherein the machine-readable visual representation further includes a priority of the one or more data elements with respect to an effect on an operation of the vehicle.

8. The method of claim 7, wherein the operation of the vehicle includes an autonomous operation of the vehicle.

9. The method of claim 8, wherein the one or more data elements apply to different autonomy levels of the autonomous operation.

10. The method of claim 8, wherein the vehicle uses the priority to determine which of the one or more data elements to use to update the local copy of the map tile, a processing order for the one or more data elements to update the local copy of the map tile, or a combination thereof.

11. The method of claim 7, wherein the one or more data elements are associated with one or more data encryption keys to restrict access to the one or more data elements.

12. The method of claim 11, wherein the one or more encryption keys is provided based on a subscription status of the vehicle, a user of the vehicle, or a combination thereof.

13. The method of claim 6,
wherein the display, the object, or a combination thereof is located in a geographic area that is determined to have no communication network availability, communication network availability below a threshold bandwidth, or a combination thereof.

14. The method of claim 6, wherein the display, the object, or a combination thereof is a ground control point with a location determined as above a precision threshold.

15. The method of claim 6, the display, the object, or a combination thereof is configured to present the machine-readable visual representation statically, to present the machine-readable visual representation variably in combination with at least one other machine-readable visual representation, or a combination thereof.

16. An apparatus comprising:
a sign having a display area, the display area providing a machine-readable visual representation, data for generating the machine-readable representation, or a combination thereof as an output,
wherein the machine-readable visual representation has map data encoded therein, wherein the map data corresponds to a map tile of a geographic database,
wherein a sensor of a vehicle is configured to read the machine-readable visual representation to decode the map data and to update or create a local copy of the map tile stored in a device associated with the vehicle.

17. The apparatus of claim 16, wherein
a tile size of the map tile is determined based an occurrence frequency, a number, or a combination thereof of a plurality of signs occurring in a sign infrastructure.

18. The apparatus of claim 16, wherein the sign is a static sign, a variable sign, or a combination thereof.

19. The apparatus of claim 16, wherein the map data includes one or more data elements, and wherein the machine-readable visual representation further includes a priority of the one or more data elements with respect to an effect on an operation of the vehicle.

20. The apparatus of claim 19, wherein the operation of the vehicle includes an autonomous operation of the vehicle, and wherein the one or more data elements apply to different autonomy levels of the autonomous operation.

\* \* \* \* \*